United States Patent
Lahey et al.

(10) Patent No.: US 7,171,373 B2
(45) Date of Patent: Jan. 30, 2007

(54) DATABASE DRIVEN WORKFLOW MANAGEMENT SYSTEM FOR GENERATING OUTPUT MATERIAL BASED ON CUSTOMER INPUT

(75) Inventors: Leonard Corning Lahey, Boulder, CO (US); Jagdish Mooljee Nagda, Boulder, CO (US); Robert Curt Nielsen, Longmont, CO (US); Dwight Ross Palmer, Longmont, CO (US); Anthony Franke Stuart, Deer Isle, ME (US); Adam Alvin Swartz, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/144,225

(22) Filed: Jun. 2, 2005

(65) Prior Publication Data
US 2005/0228711 A1    Oct. 13, 2005

Related U.S. Application Data

(63) Continuation of application No. 09/422,593, filed on Oct. 21, 1999, now abandoned.

(51) Int. Cl.
*G06Q 10/00* (2006.01)
(52) U.S. Cl. .................. 705/7; 705/8; 705/9; 715/505; 715/511; 715/514
(58) Field of Classification Search .................. 705/7
See application file for complete search history.

(56) References Cited

U.S. PATENT DOCUMENTS 4,853,852 A    8/1989    Rosen (Continued)

FOREIGN PATENT DOCUMENTS

WO    WO 9908205    2/1999

OTHER PUBLICATIONS

The Seybold Editors' Hot Picks for Seybold San Francisco Publishing 98 [online], retrieved on Aug. 29, 1999 from Internet <URL:http://www.seyboldseminars.com/Events/sf98/hotpicks-print.htm>.*

(Continued)

*Primary Examiner*—Romain Jeanty
*Assistant Examiner*—Andre Boyce
(74) *Attorney, Agent, or Firm*—David W. Victor; Konrad Raynes & Victor LLP

(57) ABSTRACT

Disclosed is a workflow management system for creating and delivering output material. A customer record is generated to include fields specifying at least one product, customer preferences, and a selected output method to deliver generated output material on the product specified in the customer record. A job record including a status field is added to a job status table for the customer record and set to a first status. A first worker generates output material from processing the product and customer preference fields in the customer record for the selected job, and sets the status for the selected job to a second status. A second worker determines a selected one of a plurality of delivery options from the customer record for the selected job and transmits the output material via the determined delivery option to the customer specified in the customer record.

21 Claims, 13 Drawing Sheets

U.S. PATENT DOCUMENTS

| | | | |
|---|---|---|---|
| 5,276,793 A | | 1/1994 | Borgendale et al. |
| 5,313,394 A | | 5/1994 | Clapp |
| 5,493,490 A | | 2/1996 | Johnson |
| 5,557,723 A | | 9/1996 | Holt et al. |
| 5,566,278 A | | 10/1996 | Patel et al. |
| 5,581,691 A | * | 12/1996 | Hsu et al. .................. 714/15 |
| 5,619,635 A | | 4/1997 | Millman et al. |
| 5,627,764 A | | 5/1997 | Schutzman et al. |
| 5,627,973 A | | 5/1997 | Armstrong et al. |
| 5,649,220 A | * | 7/1997 | Yosefi .................. 715/526 |
| 5,692,206 A | | 11/1997 | Shirley et al. |
| 5,696,965 A | | 12/1997 | Dedrick |
| 5,710,884 A | | 1/1998 | Dedrick |
| 5,717,923 A | | 2/1998 | Dedrick |
| 5,724,521 A | | 3/1998 | Dedrick |
| 5,729,751 A | | 3/1998 | Schoolcraft |
| 5,740,549 A | | 4/1998 | Reilly et al. |
| 5,752,246 A | | 5/1998 | Rogers et al. |
| 5,778,368 A | | 7/1998 | Hogan et al. |
| 5,778,377 A | * | 7/1998 | Marlin et al. ........... 707/103 R |
| 5,790,790 A | | 8/1998 | Smith et al. |
| 5,826,239 A | | 10/1998 | Du et al. |
| 5,832,504 A | | 11/1998 | Tripathi et al. |
| 5,862,404 A | | 1/1999 | Onaga |
| 5,870,545 A | | 2/1999 | Davis et al. |
| 5,893,075 A | | 4/1999 | Plainfield et al. |
| 5,893,111 A | | 4/1999 | Sharon, Jr. et al. |
| 5,918,226 A | * | 6/1999 | Tarumi et al. ................. 707/10 |
| 5,940,804 A | * | 8/1999 | Turley et al. .................. 705/9 |
| 5,964,156 A | * | 10/1999 | Smith et al. ................. 101/471 |
| 6,088,679 A | * | 7/2000 | Barkley .......................... 705/8 |
| 6,144,975 A | * | 11/2000 | Harris et al. ................. 715/500 |
| 6,151,583 A | * | 11/2000 | Ohmura et al. ................. 705/8 |
| 6,173,295 B1 | * | 1/2001 | Goertz et al. ................ 715/505 |
| 6,233,537 B1 | * | 5/2001 | Gryphon et al. ................ 703/1 |
| 6,239,802 B1 | * | 5/2001 | Lahey et al. ................. 715/810 |
| 6,289,513 B1 | * | 9/2001 | Bentwich ..................... 717/106 |
| 6,345,256 B1 | * | 2/2002 | Milsted et al. .................. 705/1 |
| 6,370,521 B1 | * | 4/2002 | Pigos et al. .................... 707/2 |
| 6,466,935 B1 | * | 10/2002 | Stuart .......................... 707/10 |
| 6,483,524 B1 | * | 11/2002 | Petchenkine et al. ....... 715/763 |
| 6,639,687 B1 | * | 10/2003 | Neilsen ...................... 358/1.14 |
| 2002/0046072 A1 | * | 4/2002 | Arai et al. ...................... 705/8 |

OTHER PUBLICATIONS

International Business Machines Corporation, IBM InfoPrint 4000 Direct Mail Printer, Sep. 1997 (c) 1997.

International Business Machines Corporation, Centralized Output Management, Sep. 1997 (c) 1997.

International Business Machines Corporation, InfoPrint Manager Fax and E-Mail, Aug. 1998 (c) 1998.

International Business Machines Corporation, IBM Enhances 1-to-1 Marketing Solution with New Technology and New Capab (c) 1998.

\* cited by examiner

| Customer Record |
| --- |

Customer Contact [                    ]
Customer Name [                    ]
Customer Address [                    ]
Contact Phone [                    ]
Fax Number [                    ]
E-Mail Address [                    ]
Industry Type [ Manufacturing ▼ ]

Customer ● Business   ○ Technical

FIG. 2A

| Customer Record | |
|---|---|
| Type of Printing | Continuous Forms ▼ |
| Customer's current issue with printers: | High maintenance ▼ |
| Associated services to be included | Distributed print services ▼ |
| Select either Products or Family | Products ▼ |

Product

1. InfoPrint 32 ▼
2. None ▼
3. None ▼

Or

Family of Products: None ▼

Delivery Method: ▼
- None
- Print
- Fax
- e-mail

FIG. 2B

*A reliable, high-throughput printer for cross-industry network applications*

IBM 3130 — 50

Highlights

60 {
- Features high throughput at up to 30 ipm, and up to 200,000 impressions per month
- Supports multiple data streams including PostScript Level 2, PCL5e and IPDS
- Handles seven paper sizes including A3/ledger (11"x17") paper

62 {
- Connects to three network interfaces simultaneously

- Offers duplex model for two-sided printing

64 {
- Separates print jobs with dedicated input trays and output stackers

- Supports up to four input trays that hold 3,000 sheets of paper

66 {
- Low cost of operation
- Increase print performance, error recovery and attachment flexibility with the AFCCU

52 \
The highly reliable, cut-sheet IBM® 3130 Advanced Function Printer combines quality printing and media flexibility with multiple-interface networking. The printer's advanced controller technology simplifies the printing operations of complex computing environments.

Environment sharing

Today's complex computing environments require a printer to support multiple data streams and network connections. The IBM 3130 natively supports PostScript® Level 2, PCL5e, and IPDS™ data streams, as well as data stream sensing and switching. With these capabilities, the IBM 3130 can print from both host and Local Area Network (LAN) connections with efficiency. The printer can also support three network interfaces simultaneously. Open system attachments include Token-Ring, Ethernet and PC Parallel interfaces.

/
54

56 \
Media flexibility

In addition to card stock and labels, the IBM 3130 handles all popular paper types and seven paper sizes, including A3/ledger (11"x17") paper. With an input capacity of up to 3,000 sheets, an output capacity of up to 2,500 sheets, and a print speed of 30 ipm, the IBM 3130 easily handles large-volume print jobs. To retain print job separation, each input tray and output stacker can be linked and dedicated to a specified application.

Advanced controller performance

The IBM 3130 leverages the power of the Advanced Function Common Control Uni™ (AFCCU™) to ensure quality, performance, reliability and efficiency. The control unit's RISC technology incorporates attachment flexibility so the printer can support Intelligent Printer Data Stream™ (IPDS) environments as well as LAN environments. The AFCCU supports

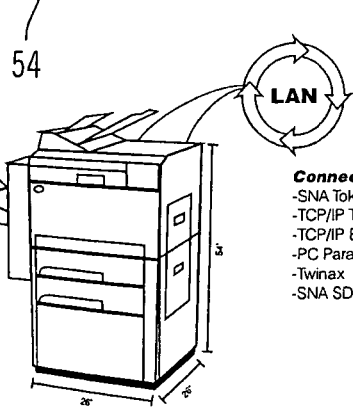

Connections
- SNA Token-Ring
- TCP/IP Token-Ring
- TCP/IP Ethernet
- PC Parallel
- Twinax
- SNA SDLC

*The IBM 3130 Advanced Function Printer features high-throughput, the AFCCU and AFP software to cost-effectively produce large print jobs over complex networks.*

FIG. 3

| Workflow Name | From Worker | From State | To Worker | To State |
|---|---|---|---|---|
| 2-up Print | GetInput | Complete | Condition | Condition Ready |
| 2-up Print | GetInput | Error | ErrHandler | InputErr |
| 2-up Print | Condition | Complete | PageConstructor | Page Ready |
| 2-up Print | Condition | Need Graphs | GraphMaker | Graph Ready |
| 2-up Print | Condition | Error | ErrHandler | CondErr |
| 2-up Print | Graph Maker | Complete | PageConstructor | PageReady |
| 2-up Print | Graph Maker | Error | ErrHandler | GraphErr |

FIG. 7

| Job ID | Current Status | Current Worker | Workflow Name | Status Timestamp | Priority | Update Flag |
|---|---|---|---|---|---|---|
| 1 | Ready | Condition | 2-up Print | | 2 | 0 |
| 2 | Ready | GetInput | 2-up Print | | 1 | 0 |
| 3 | Need Graphs | Condition | 2-up Print | | 2 | 1 |
| 4 | Complete | Graph Maker | 2-up Print | | 1 | |

FIG. 8

DATABASE DRIVEN WORKFLOW MANAGEMENT SYSTEM FOR GENERATING OUTPUT MATERIAL BASED ON CUSTOMER INPUT

CROSS REFERENCE TO RELATED APPLICATIONS

This application is a continuation of U.S. patent application Ser. No. 09/422,593, filed on Oct. 21, 1999 now abandoned, which application is incorporated herein by reference in its entirety.

BACKGROUND OF THE INVENTION

1. Field of the Invention

The present invention relates to method, system, and program for a database driven workflow management system for the automated creation and delivery of customer output and, in particular, output material based on customer input.

2. Description of the Related Art

Direct mail printers and printer software allow a user to generate and print marketing materials tailored for different customers. Many systems have a database of customer information and merge the customer information from the database into customer marketing material forms that are then mailed or otherwise distributed to the customer. Typically, the marketing material forms have variable fields into which the customer information is inserted from the database during the process of merging the forms with the database data.

The effectiveness of a direct mail marketing campaign can be significantly improved by customizing the content of marketing materials to each customer's needs and situation. Existing and potential customers will more likely pay attention to marketing materials that appear to directly address issues that are pertinent to the customer. Likewise, customers will tend to ignore marketing materials that include information that is irrelevant to the their needs and preferences. Thus, computerized direct mail marketing methods continually seek to provide ways to further customize direct mail marketing materials to the specific needs and desires of customers.

One current problem with customized mail marketing is that substantial human intervention is needed to gather the customer information and prepare the generated customized marketing material for distribution. After the files are generated they are typically printed, then placed in an envelope. There can often be a considerable lag time between the time customer information is gathered and the customized materials are generated, then mailed to the customer.

Delivery of non-customized marketing material can occur instantly, and is sometimes transmitted via facsimile or electronic mail. However, for the reasons discussed above, non-customized marketing material is not as effective a marketing tool as customized information.

Accordingly, there is a need in the art for an improved system, method, and program for generating and delivering tailored marketing materials to existing and potential customers.

SUMMARY OF THE PREFERRED EMBODIMENTS

To overcome the limitations in the prior art described above, preferred embodiments disclose a workflow management system for creating and delivering output material. A customer record is generated to include fields specifying at least one product, customer preferences, and a selected output method to deliver generated output material on the product specified in the customer record. A job record including a status field is added to a job status table for the customer record. The added job record status is set to a first status. A selected job is processed in the job status table. A first worker is invoked if the selected job has the first status. The first worker generates output material from processing the product and customer preference fields in the customer record for the selected job. The status for the selected job in the job status table is set to a second status after generating the output material. A second worker is invoked if the selected job has the second status. The second worker determines a selected one of a plurality of delivery options from the customer record for the selected job and transmits the output material via the determined delivery option to the customer specified in the customer record.

In further embodiments, the first status is associated with the first worker and the second status is associated with the second worker. The first and second workers further query the job status table to access all jobs having the status associated with the worker.

In still further embodiments, the job status table is processed by a supervisor program that polls the job status table at predetermined intervals. In such case, the supervisor program performs the steps of invoking the first and second workers and setting the status to the second status. The supervisor program processes every record in the job status table when performing the polling operation.

Preferred embodiments provide a database driven workflow management system for creating and delivering output material and, especially, direct marketing material. A job enters the workflow system by adding a record to a job status table for a generated customer record and setting the status to a first status. The customer record is used to determine the output to generate onto a template, which when generated includes the tailored marketing information to send to the customer. A worker invoked in response to the first status processes the customer record to generate the output material. Other workers are also used to post-process the output, generate the output and then automatically transfer the processed output material to the customer via different possible transmission routes specified in the customer record.

The database driven workflow system is defined by associating each worker with an input status. The ordering of worker processes is defined by setting the status of the job to the input status of the next worker in the workflow process as indicated in the database after processing the job. In this way, a change in the workflow as defined by the input and output statuses changes the workflow environment to provide a just-in-time type system for processing jobs using database technology. This system automatically routes a print job through various states to generate and deliver output material without the need of human intervention.

BRIEF DESCRIPTION OF THE DRAWINGS

Referring now to the drawings in which like reference numbers represent corresponding parts throughout:

FIGS. 2a and 2b illustrate an entry form to enter a customer record in accordance with preferred embodiments of the present invention;

FIG. 3 illustrates an example of marketing material generated in accordance with preferred embodiments of the present invention;

FIG. 7 illustrates a workflow transition table in accordance with preferred embodiments of the present invention;

FIG. 8 illustrates a job status table used with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
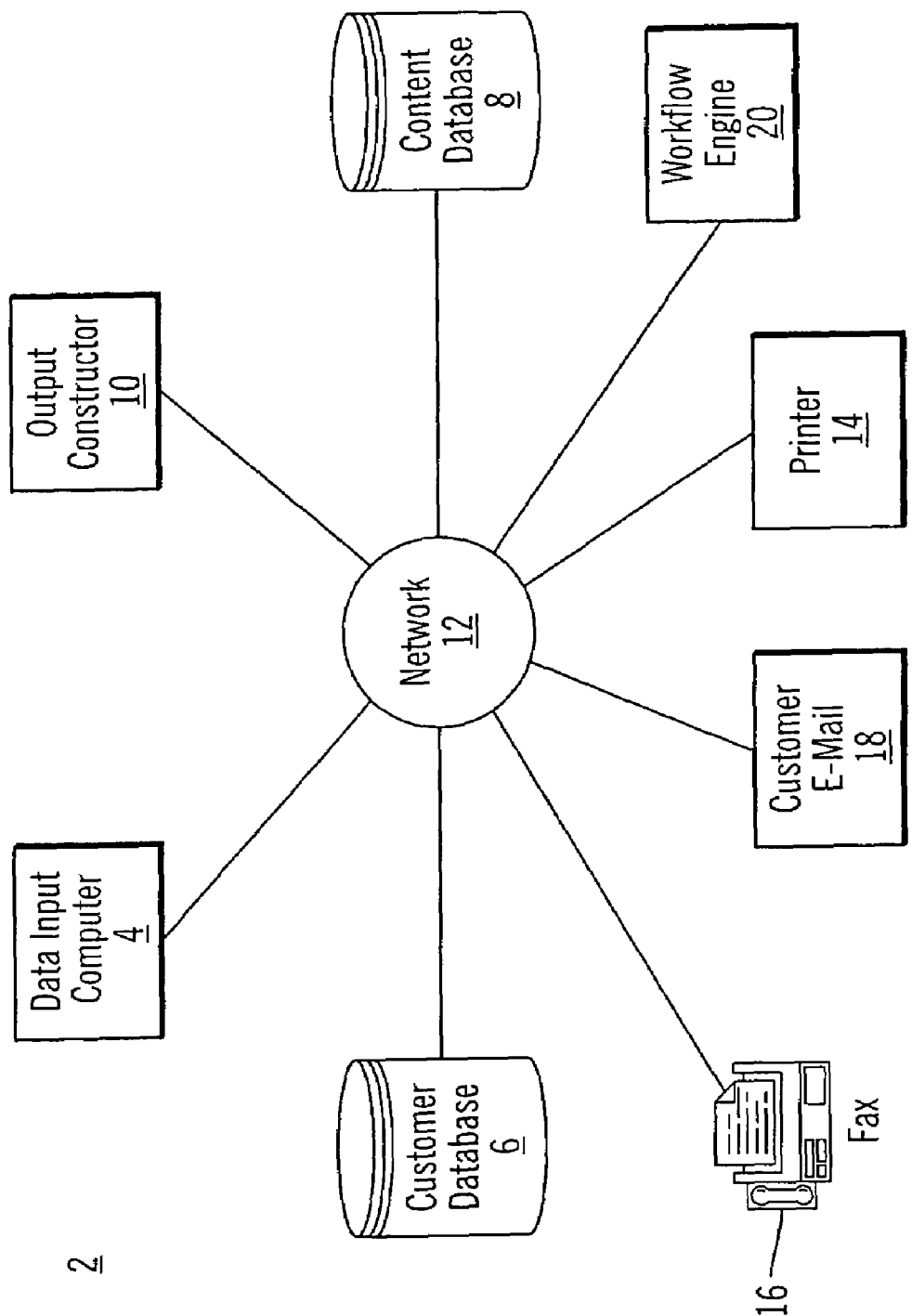
FIG. 1 is a block diagram illustrating a computing environment in which preferred embodiments of the present invention are implemented.

FIG. 1 illustrates a network environment 2 in which preferred embodiments are implemented. One or more data input centers 4 are used to gather information on existing and potential customers and store the information in customer records in a customer database 6. A content database 8 is comprised of files that include content to insert into a template describing a layout of the marketing materials (discussed below). The content of the files in the content database 8 may comprise any image and text type known in the art, including three dimensional images, holographic images, watermark, etc. Further, if the marketing pages are to be viewed in a Java enabled or other multi-media viewer, then the file may include video images, sound files, three dimensional images, and any other multi-media format known in the art.

An output constructor 10 receives the template and using information in a customer record from the customer database 6 and the content database 8 populates the template with marketing information tailored for the customer. After generating direct marketing material comprised of the populated template in accordance with preferred embodiments described below, the output constructor 10 may then direct the marketing material to a printer 12 for printing or to a facsimile (fax) machine 14 for facsimile transmission to the targeted customer. Further, the marketing materials may be converted into a portable format, such as an Hypertext Mark-Up Language (HTML) or XML page or in the an ADOBE ACROBAT** format to transmit to the customer via e-mail 16. A network 12 provides communication among the data input computer 4, customer database 6, content database 8, output constructor 10, printer 14, fax machine 16, an e-mail gateway 18 to customers, and a workflow engine 20. The network 18 may be comprised of any network system known in the art including TCP/IP network (e.g., an Intranet, the Internet), LAN, Ethernet, WAN, Token Ring, etc. Alternatively, there may be separate and different networks between the components.

**AIX, OS/2, and RS/6000 are registered trademarks of IBM and OS/390 and MVS are trademarks of IBM; WINDOWS is a registered trademark of Microsoft Corporation; UNIX is a registered trademark licensed by the X/Open Company LTD; ADOBE ACROBAT is a registered trademark of Adobe System, Inc.; PAGEFLEX is a trademark of Bitstream, Inc.

The data input computer 4 and output constructor 10 would include an operating system such as MICROSOFT WINDOWS 98, WINDOWS NT, AIX, OS/390, OS/2, MVS, and may be comprised of any suitable server and client architecture known in the art. The output constructor 10 would include software suited for processing multiple large print jobs, such as the IBM InfoPrint manager software that runs on the IBM RS/6000 server under the AIX operating system.

**AIX, OS/2, and RS/6000 are registered trademarks of IBM and OS/390 and MVS are trademarks of IBM; WINDOWS is a registered trademark of Microsoft Corporation; UNIX is a registered trademark licensed by the X/Open Company LTD; ADOBE ACROBAT is a registered trademark of Adobe System, Inc.; PAGEFLEX is a trademark of Bitstream, Inc.

The customer 6 and content 8 databases maybe located on the same database server or on separate database servers. The data input computer 4 and output constructor 10 would include client database software to communicate with the server(s) including the customer 6 and content 8 databases. The client/server database software to implement the customer 6 and client 8 databases in the network 2 may be comprised of any client/server database program known in the art, such as IBM DB2, Oracle Corporation's ORACLE 8,** etc. The client/server database software would allow the data input computer 4 and output constructor 10 to transfer data, execute SQL queries, and update data with respect to the customer 6 and content 8 databases in a manner known in the art.

**AIX, OS/2, and RS/6000 are registered trademarks of IBM and OS/390 and MVS are trademarks of IBM; WINDOWS is a registered trademark of Microsoft Corporation; UNIX is a registered trademark licensed by the X/Open Company LTD; ADOBE ACROBAT is a registered trademark of Adobe System, Inc.; PAGEFLEX is a trademark of Bitstream, Inc.

The printer 14 may be any large scale printer capable of mass printing marketing materials, such as the IBM Info-Color 70. The facsimile machine 14 is preferably capable of handling multiple facsimile transmissions at a time to batch process facsimile jobs. For instance, the output constructor 10 may immediately transmit generated output or, alternatively, save generated output for later batch processing of the transmission operations. Details of the InfoPrint manager and printing documents to alternative output devices such as e-mail and fax machines is described in the IBM publication, "IBM InfoPrint Manager for AIX: Administrators Guide Version 3, Release 1," IBM Document No. S544-5595-00 (October 1998), which publication is incorporated herein by reference.

The database driven workflow engine 20, described below, controls the scheduling of the processing of the job and manages the entire job flow from data input, through formatting to the output 14, 16, and 18.

Gathering Customer Information

In preferred embodiments, detailed information about a customer may be gathered by an operator at a marketing call center. The operator at the marketing call center speaks with a representative of the customer and enters information at the data input computer 4 into a customer database record for that customer. The operator would enter the data into a database entry form. FIGS. 2a and 2b provide an example of a customer record database entry form, showing two different scrolled areas of the same page, including customer information fields. With respect to FIG. 2a, the customer contact field could include information on the contact person of the customer. Further fields may be provided for the address, title, mail-stop, etc., of the contact. The customer name and location fields may include further sub-fields for the address components of the customer location. The industry type field indicates the industry in which the customer operates and the customer boolean field indicate whether the customer is a business or technical entity. For instance, this may indicate whether the contact has specific technical knowledge and understanding of the equipment or is focused on less technical, business operations.

FIG. 2b shows further fields in the customer record, including the type of printing of interest to the customer; concerns the customer has about the printer product (customer's current issue with printers); associated services of interest. This page also allows the operator to enter information on the services and features of interest to the customer. Below is a drop down list to allow the operator to select a desired delivery method for the customer. Upon selecting a delivery method, the program would prompt the user to enter customer address information for the delivery method, e.g., e-mail address, fax number, street address, etc.

Each of the fields included in the customer record entry form illustrated in FIGS. 2a and 2b generates information into fields or columns of a database record for the customer. The customer database would include a column for each field of information provided in the form. A customer record is created each time the operator fills in information for a product of interest to the customer. Thus, if the customer is interested in different products, then different customer records would be generated, one for each product. The customer records are stored in a table in the customer database 6.

Alternatively, information to enter into the customer record fields (columns) may be mined from a database of information on the customer. This database is mined to gather information that can then be inserted into customer records.

The arrangement and selection of fields to include in customer records would be determined during the design of the layout of the template. A template would be designed to include information on the product. A template is comprised of containers, which are sections into which files from the content database 8 are inserted. Each of the files in the content database 8 include metadata in the form of a database record in the content database 8 that provides attributes associated with the file. The metadata would include fields or columns of information that corresponds to the fields in the customer record. Thus, the meta data for a particular file could indicate whether the information is for a business or technical oriented contact, corresponding to the business or technical selection in the customer record and a size of the company, along with other indicators of preferences addressed by the file. For instance, a file could include information tailored to a non-technical person at a large company. The needs of a large company are quite distinct from that of a small company. Thus, the files inserted into the container may be customized depending on both the background of the contact and size of the company. In this way, there is a correspondence of fields (columns) in the customer records in the customer database 6 and fields (columns) the metadata records for each file in the content database 8.

A search engine would query the metadata record of a file using data entered in the fields of a customer record, such that a file is selected having metadata attributes matching attributes associated with the customer in the customer record. The query may query the metadata records on multiple attributes from the customer record, e.g., contact background (e.g., technical or business), size of company, and some other customer preference.

The template bridges files in the content database 8 and the customer records in the customer database 6 to generate tailored marketing material. In this way there are two levels of customization, one based on generating information directly from the customer record to the template and the second is based on using the preferences and information in the customer record to query and select a file that includes content tailored to the customer expressed preferences based on multiple degrees of customization, e.g., size, contact background, and any other preferences. Thus, a file to insert into a container may be queried on multiple customizing variables, i.e., multiple customer specific attributes entered in the customer record in the customer database 6. With this multi-level customization, a customized file may be selected to generate customize information in a container and the customized information may include external references to data in the customer record to provide a second layer of customization to the container.

Figure 4:
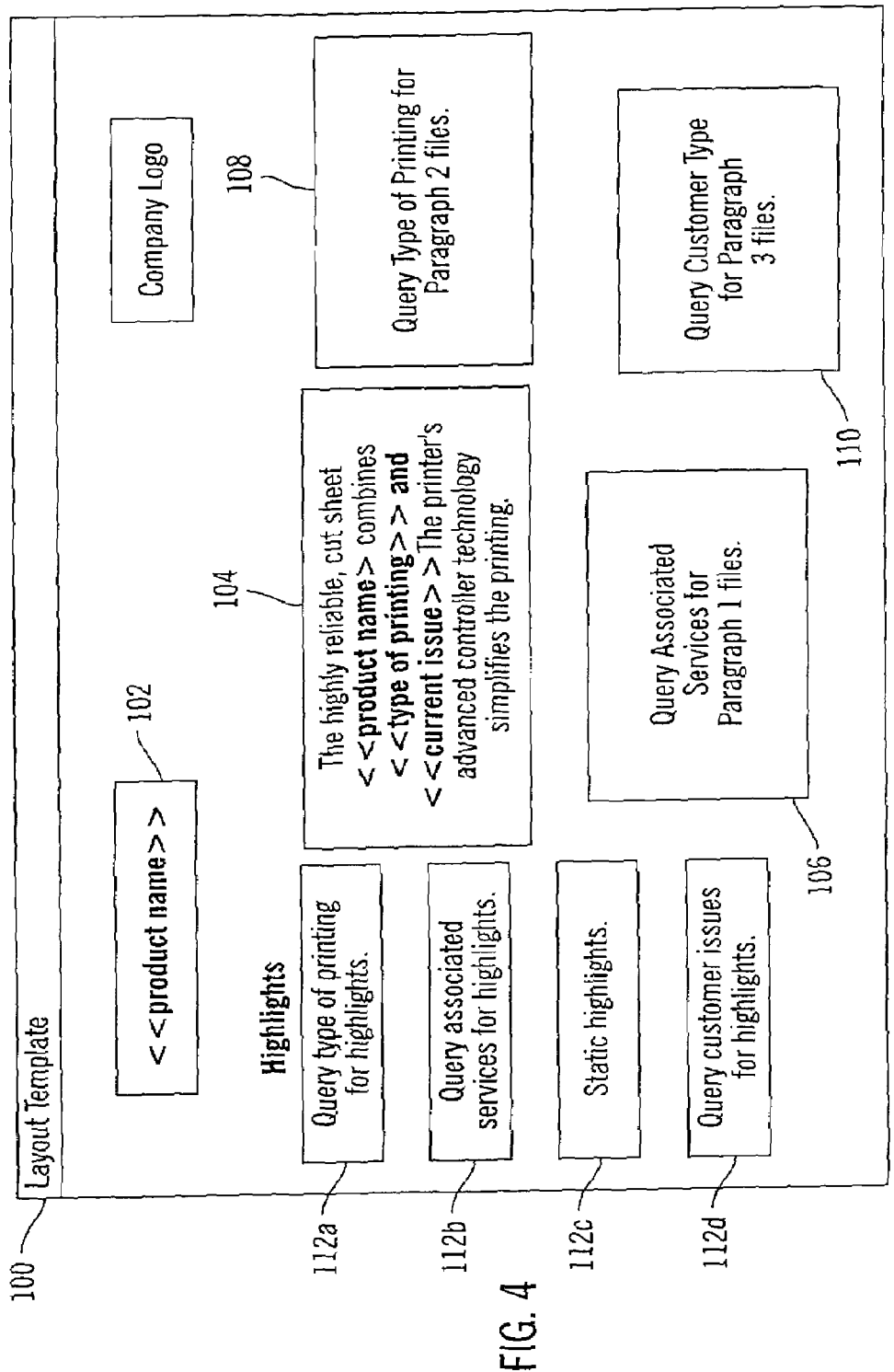
FIG. 4 illustrates an example of a layout of a template used to generated tailored marketing material in accordance with preferred embodiments of the present invention.

FIG. 3 illustrates an example of a marketing brochure produced in accordance with the preferred embodiments. A designer would design the layout of a template including containers, which are regions of the template into which content from files from the content database 8 are inserted. FIG. 4 illustrates a template 100 in which the user defines the layout of how content in the files in the customer 6 and content databases 8 will be inserted into the template 100 to generate the marketing material. The designer creates containers within the template 100. A product name container 102 displays the name of the product of interest to the customer. This information is accessed directly from the Product field (shown in FIG. 2a) of the customer record and displays the product name, numbered as 50 in FIG. 3.

An introduction container 104 includes a reference to an introductory file. As shown in container 104, the introductory file includes static text and references to variable data in the customer record. The introductory container 104 may also include a query of introduction files based on contact background (technical or business) and the size of the company. This would select an introduction file including information tailored to the contact background and company size. The introduction container 104 further includes the ability to insert variable customer information from the customer record directly into the introduction text to tailor the introduction to the customer, the contact background, and the company size.

A first paragraph container 106 includes the first paragraph following the introduction. To access files from the content database 8 to insert into a container, the designer would insert an SQL query into the container 106 to query the metadata records in the content database 8 to find a file that matches the queried value from the customer record. The content database 8 is set-up such that there are numerous files created for each container. The metadata of each file associates each file with one of the containers. The metadata further includes values in one or more columns (fields) that correspond to fields in the customer record including operator entered customer preferences. For instance, there may be numerous files dedicated to paragraph 1, each having in the associated services column one of the possible values for this column that could be entered for the customer. Further each file for paragraph 1 may have further degrees of customization upon the contact background and company size. The container 106 includes an SQL query to query the "associated services" column in the metadata record for a value that matches the value for this same column in the customer record. Thus, the container 106 includes the type of query, i.e., columns that will be queried, and the search criteria for the query is determined dynamically from the customer record. FIG. 3 shows an example of the paragraph 1 inserted, numbered as 54, when Environment Sharing was entered as an associated service to include for the customer.

Similarly, container 108 includes a query on the type of printing. This searches the files for paragraph 2 that have a "type of printing" column value that matches the type of printing in the selected customer record. In the example, the customer record, in FIG. 2a, shows the "type of printing" as continuous forms. This would cause the selection of a file including in its associated metadata indication that it is a paragraph 2 file and that has a value of "continuous forms" in the "type of printing" column. As shown in FIG. 3, the "continuous forms" value causes the insertion in the paragraph 2 container 108 of a file including information on media flexibility, numbered 56 in FIG. 3, which describes the type of forms and data that may be driven through the system.

The above description highlights how a designer would design the template 100, format of the customer records (FIGS. 2a, b), and the files and metadata to include in the content database. First the designer would determine the containers to include in the template and then the type of content to include in each container that would interest the customers. The designer would then determine a way to describe different attributes values for the ways in which the interest could be classified. The customer record entry form would be designed to allow an operator to select one of multiple attribute values for the interest. Further, the files to fill in the container associated with the customer interests and demands would include a field indicating the container with which it is associated and each file would include in the field corresponding to the interest one of the attribute values for the interest. In this way, each file would include information tailored to the possible attribute and interest values in the customer record. For instance, the value for the "type of printing" attribute would determine the selection of a file, for container 108, having a value in the "type of printing" attribute field equal to the value entered for this field in the customer record. In this way, each file in the content database 8 associated with a container has an attribute value in a field (column) corresponding to an attribute value in a field (column) in the customer record. The container would include a query to search the metadata of the files associated with the container for a file that has an attribute value matching the attribute value in the column.

For example, container 110 indicates a "customer type" field, which corresponds to the selection in the customer record entry form of "business" or "technical" A query of this field for business would include a section description more useful for business, non-technical types, such as a general description of functions; whereas a technical value would refer to the file including a technical description. The layout 100 also includes containers 112a, b, c, d to generate the display of product highlights, shown as numbers 60, 62, and 64 in FIG. 3. One or more highlights are filled into the containers 112a, b, c, d from files in the content database 8 Each highlight container 112a, b, c, d includes a query of the metadata in the content database 8 to retrieve the file for the highlights having a column value matching the search value in the corresponding column in the customer record. For instance, the "type of printing field," indicates the type of printing the customer is interested, which is shown as "Continuous forms" in FIG. 2b. The container 112a would insert highlights relating to the type of printing from a file having a "type of printing" metadata field value matching that for the customer record. The "type of printing" highlights are shown as highlights 60 in FIG. 3. For the second container 112b, the query on the "associated services" field (column) would search for the value for this field in the customer record, which is "Distributed print services." This accesses the file having the same value in the "associated services column," which displays the "Environment Sharing" paragraph shown as the highlight numbered 62 in FIG. 3. The third container 112c provides static highlights which are generated directly from the container, without access from either database 6 or 8, fixed and not variable information. These static highlights are features for the product to always include in the marketing material, and shown as number 64 in FIG. 3. The last highlight container 112d retrieves the file having a "customer issues" value matching that of the customer record.

Figure 5A:
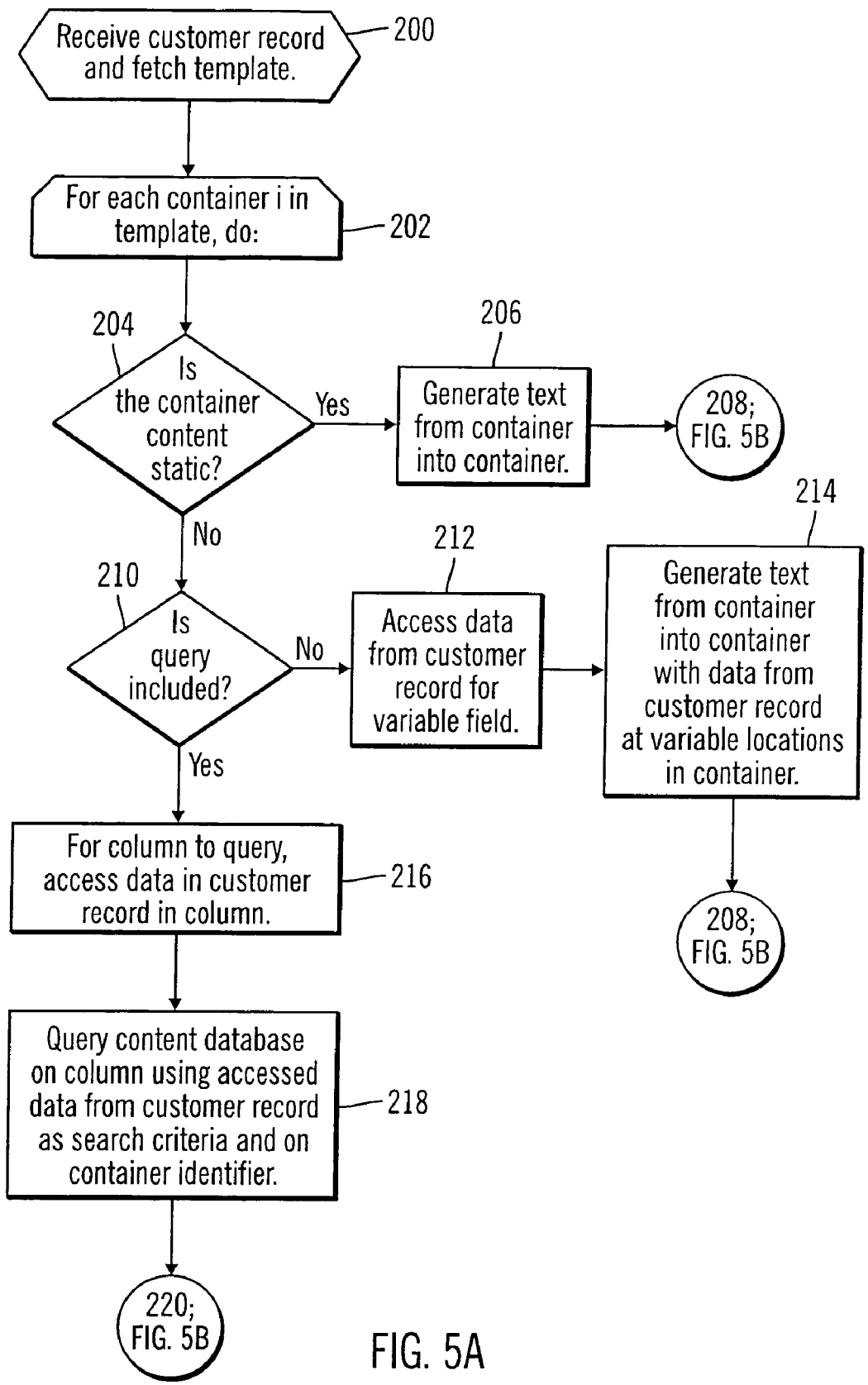
FIGS. 5a and 5b illustrate logic to generate marketing material in accordance with preferred embodiments of the present invention.

FIGS. 5a, b illustrate logic implemented in the output constructor 10 to process a template 50, the customer database 6, and the content 8 databases to generate marketing output. Control begins (at block 200) with the output constructor 10 receiving a customer record from the customer database 6 and retrieving a template. The output constructor 10 may receive templates and records during a batch processing mode to generate marketing materials from a template for multiple customer records. Alternatively, the output constructor 10 may selectively process customer records to generate the output material. The output constructor 10 then begins a loop at block 202 for each container i in the template. Within the loop, the printer manager first determines (at block 204) whether the content in the container is static, i.e., no variables referencing data in the customer database 6 or the content database 8. If so, the output constructor 10 generates (at block 206) the static text from the container into the output and proceeds (at block 208, in FIG. 5b) to process the next container by returning to block 202. If the content is not static, then the output constructor 10 determines (at block 210) whether a query is included. If not, then the reference must be to a field in the customer record and the data from the customer record for the column (field) identified in the container is accessed (at block 212) from the data in the customer record. The output constructor then generates (at block 214) the text from the container into the output with the variable data from the customer record at the location where the variable was placed. For instance, in container 104 in FIG. 4, there are references to variables corresponding to fields in the customer record to insert in the text to conform the introductory paragraph 104 to the preferences for the customer entered in the customer record. As shown in number 52 in the output in FIG. 3, the introduction paragraph mentions specific key concerns and preferences for the customer. After generating the text into the container, control proceeds (at block 208) back to block 202 to process the next container.

If a query is included in the container, then the output constructor accesses (at block 216) the data in the customer data record column corresponding to the column subject to the query. The output constructor then builds and submits a query (at block 218) to query metadata records in the content database 8 for records for the container i and satisfying the search criteria and value from the customer record. If there is a matching metadata record (at block 220, in FIG. 5b), then the output constructor 10 accesses the file associated with the metadata record and generates (at block 226) the content of the accessed file into the output. If (at block 220), there was no matching data record, then the output constructor 10 would access default content for the container. After generating the content, control returns to block 202 to consider the next container until all containers have been considered. After generating the final output, the output constructor 10 determines the output device, from the customer record, and then sends the generated output to the output device to send to the customer.

The selected output device indicated in the customer record may determine how the output is generated. For instance, if the marketing output will be transferred by e-mail 18, then the document may be transformed into an Adobe Acrobat format, or other portable document format, for transmittal for the e-mail system. For the fax 14 and the printer 14, the output would be similarly tailored to those or any other output devices. The generated output is then converted (at block 230) into a format compatible with the output device. For instance, if the output device is the fax 14, then the output would be converted into the CCIT Group 3 fax format, and if the output device is the e-mail gateway 18, then the output is converted into the Adobe Acrobat PDF format for attachment to an e-mail message to the customer.

The output constructor then builds (at block 232) delivery parameters for the converted output. The delivery parameters would comprise other components to include with the converted output when transmitting through the output device. For instance, for the fax 14, the delivery parameters could define a fax cover page to include with the marketing materials. The output constructor 10 would insert data into the fax cover page from the customer record, e.g., the customer's fax, contact person, etc. For e-mail, the delivery parameters would comprise the e-mail message including customer information in the address fields obtained from the customer record. The output constructor 10 would then transmit (at block 234) the converted output material along with any delivery parameters to the customer via the appropriate output device, e.g., printer 12, fax 14, e-mail. 18.

Further, the customer database 6 may include status records, fields or tables associated with customer records indicating the status of generation and transmission of output material for an associated customer record. e.g., whether output material was generated for a customer, transmitted, successfully transmitted, failed, etc. In this way, the customer database 6 serves as the status focal point of the system. An administrator could also query the status records to determine the status of generating and transmitting output material for a given customer record. Further embodiments would include error handling mechanisms if the transmission of the output material via the fax 14 or e-mail gateway 18 fails. The system could automatically query the status records for failed transmissions, and then redrive the transmissions or automatically notify an administrator to take corrective action, such as check whether the customer contact and address information is correct.

Preferred embodiments utilize software to format the generated output to align properly in the columns of the marketing material. The template 50 and containers therein may be generated using page layout software known in the art, such as the PAGEFLEX** software, which provides tools for a user to design a layout of containers into which data from a database is generated. This software further expands or shrinks the size of the containers based on the amount of data generated therein, such that each container maintains its relationship as defined in the layout in the output. With this software, text in a container may also be wrapped around any image inserted into the container. Further details of the Pageflex software is described in the publication "Pageflex Server Setup and Reference Guide Version 1.5.1" (Copyright Bitstream Inc., 1998–99), which publication is incorporated herein by reference in its entirety.

**AIX, OS/2, and RS/6000 are registered trademarks of IBM and OS/390 and MVS are trademarks of IBM; WINDOWS is a registered trademark of Microsoft Corporation; UNIX is a registered trademark licensed by the X/Open Company LTD; ADOBE ACROBAT is a registered trademark of Adobe System, Inc.; PAGEFLEX is a trademark of Bitstream, Inc.

Preferred embodiments provide a system, method, and program to tailor marketing material to include information that is relevant to the customer's needs and interests. Further, by using the same layout design across products all the marketing material from the customer has the same look-and-feel. Thus, to the extent the company has a design that is particularly effective in conveying marketing information and associates the company with the material, this design and layout can be utilized for all products and to present the tailored information to the customer. Preferred embodiments provide a system for associating customer interests and demands with particular files that include pertinent information specific to the customer's interests and demands to generate into the output for that customer. In this way, different customers may receive different information in their marketing materials, dependent upon customer interests and demands entered into the customer records.

In preferred embodiments, numerous print requests are batched for different customer records. The batch job is then sent to the output constructor 10 to generate output for the output device 14, 16, and 18 indicated in the record. The formatted template into which all the file contents are generated is then use to create a full color PostScript file along with the delivery output information specified in the customer record. The output constructor 10 then transforms the output PostScript files to a format that is compatible with the customer specified output device 14, 16, and 18, such as an Adobe Acrobat PDF file for e-mail or a fax format, such as CCITT Group 3, known in the art. A delivery routine implemented within the output constructor then takes the delivery formatted output file and manages the printing, e-mailing and faxing of the output. If e-mail or fax is selected as the preferred output method, a hard copy of the PostScript file is printed and mailed to the customer.

Thus, preferred embodiments provide an integrated automated creation and delivery system for gathering customer data, submitting customer data, and then printing in an automated manner. Once the customer specific information is entered into a customer record, then the entire printing processes can generate tailored marketing materials and automatically print or otherwise distribute the output based on a customer preferred output system.

Using a Database Driven Workflow Manager to Control the Production Process

Figure 6:
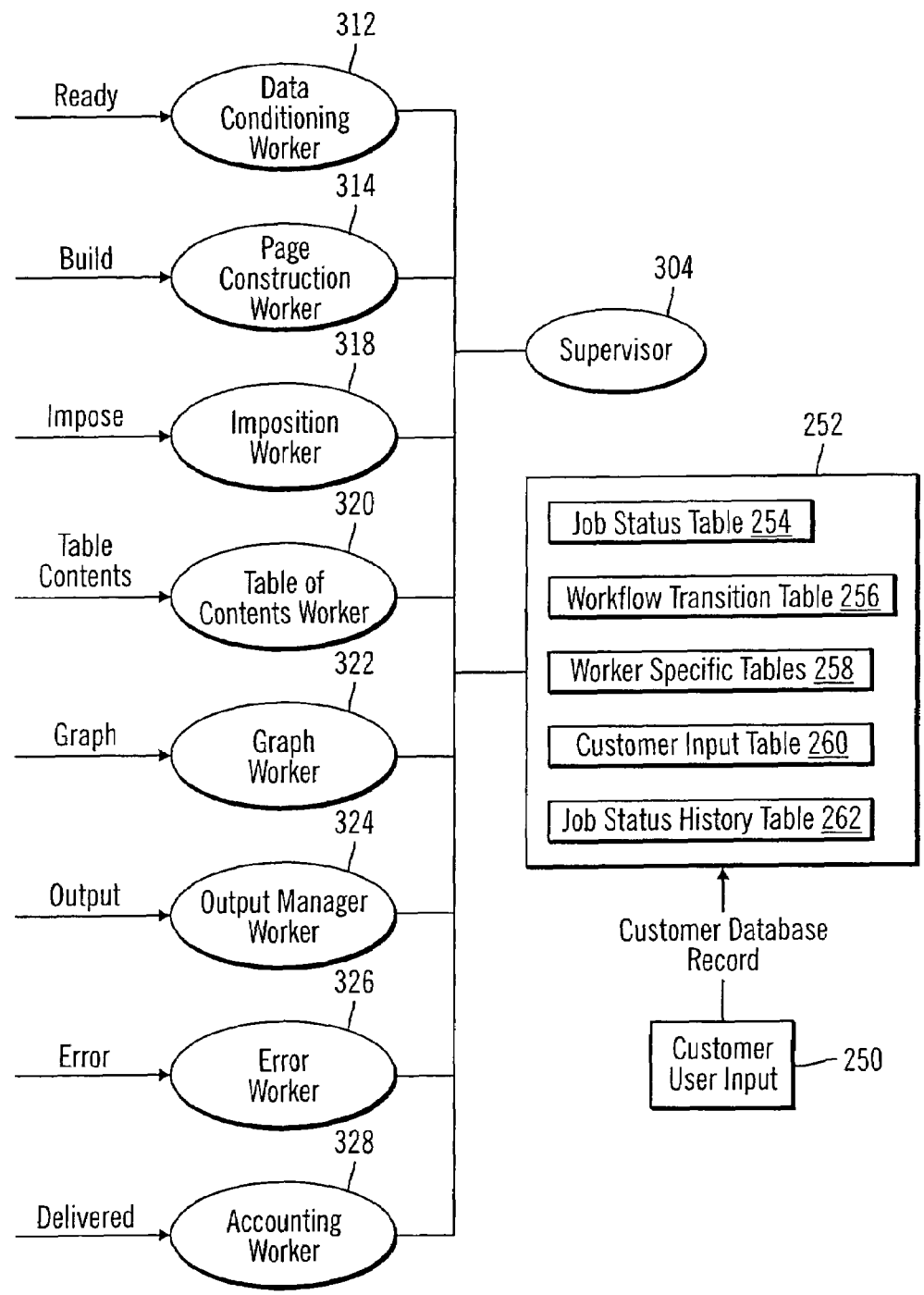
FIG. 6 illustrates an example of components of the workflow management system in accordance with preferred embodiments of the present invention.

In preferred embodiments, a customer record is processed according to a database driven workflow management system. After a customer record is created at the data input computer 4, then information on the customer record is added to a job status table. FIG. 6 illustrates components of the database driven workflow management system in a production system. The database driven workflow management system utilizes a database 252 including a job status table 254 (such as the job status table 254 shown in FIG. 6), a workflow transition table 256, worker specific tables 258, a customer input table 260, and a job status history table 262. Preferred embodiments utilize the workflow management system described in the copending and commonly assigned patent application entitled "Applying Relational Database Technology to Process Control in Manufacturing Processes," having U.S. Ser. No. 09/327,372 and filed on Jun. 4, 1999, which patent application is incorporated herein by reference in its entirety. After a customer record is created through customer user input 250, or from mining corporate databases, the customer database record is added to the customer input table 260.

A supervisor workflow manager 304 process polls the customer input table 260 and the job status table 254. Upon locating a new customer record in the customer input table 260, the workflow manager 304 would create a record in the job status table 254 for the new customer record and set the status for that job to ready. This begins the workflow process to create a job for the new customer input record in the customer input table 260. Each worker comprises a self-contained application program that performs a specific piece of work on a print job in the direct mail processing system. Each worker 312, 314, 318, 320, 322, 324, 326, and 328 is associated with one input status and one or more output statuses depending on the completion status of the job when the worker is completed precessing the job.

The workflow transition table 256 includes the input and output statuses for each worker. When a worker completes 312, 314, 318, 320, 322, 324, 326, or 328 its processing of the job, either the worker, the supervisor 304 or some other application would determine the appropriate output status for that worker from the workflow transition table 256 and then set the new status for the job to that determined output status. In this way, an administrator can readily modify the workflow by only updating data in just the workflow transition table 256. Further, in preferred embodiments, the workers do not interact directly, except through altering settings in the workflow transition table 256.

The workflow transition table 256 may indicate for each worker different outputs for different outcomes. If the outcome is an error, then the output status may be an error state. If the outcome is successful, then the output status would be the input status of the next worker in the workflow process.

FIG. 7 illustrates an example of a workflow transition table 330 including a workflow-having the name "2-up Print". Thus the workflow transition table 330 may include multiple workflows identified by the "Workflow Name" field. The "From Worker" indicates the input worker and the "From State" indicates a possible state that may occur after the "From Worker" completes processing the job. For instance, the "From Worker" GetInput ends a job with one of two possible states, "complete" or "error." The "From Worker" Condition completes a job in one of three states, "complete," "NeedGraphs" or "error". The "To Worker" indicates the output worker that the supervisor 308 invokes upon receiving a message that the "From Worker" ended a job in the "From State". The "To State" indicates the output state the supervisor 308 sets for the job when a job is completed by the worker indicated in the "From Worker" field with the result indicated in the "From State."

In preferred embodiments, the worker completing a job (From Worker) would update the status in the job status table 252 to the "From State" indicating the outcome of processing the job, e.g., complete or error and set a flag indicating that the record was updated. The supervisor 308 would then poll the job status table. FIG. 8 illustrates an example of a job status table 252 that includes a job ID, current status, current worker, workflow name, status time stamp, priority, and update flag. The current status indicates a current status and the current worker indicates the worker currently processing the job. The workflow name column indicates the name of the workflow processing the job, the priority column indicates a priority of the job, and the update flag indicates when a record is updated by one worker or the supervisor 308.

When a worker completes processing a job, the worker would set the current status to the status representing the outcome of the processing, complete, error, need graphs, etc., and the update flag to on. The supervisor 308 when polling the job status table would examine those job records having an update flag "on" and determine whether the current worker and current status in the job record matches the "From Worker" and "From State" in one worker transition table record. If there is a match, then the supervisor 308 sets the current status to the "To State" and current worker to the "To Worker" in the matching worker transition record. The update flag would be left "on." The supervisor 308 would then invoke the "To Worker" to cause the "To Worker" to process the job table and recently updated record. The invoked worker, upon locating a record with the update flag "on" and having a Current Worker and Current status matching its input status, would turn the update flag "off" and then process the job.

For instance, if the Condition worker completed a job, it would update the current status in the job status table to complete and set the update flag to "on". Upon polling the job status table, the supervisor 308, would process the record having its update flag "on", and notice that the current status of Condition and current state of complete for the job record matches the "From Worker" and "From State" in one transition record. The supervisor 308 would then update the current worker and current status in the job record to the "To Worker" and "To State" in the matching workflow transition table record. Upon updating a record in the job status table, the supervisor 308 would invoke the new current worker to process the job status table.

Moreover, the supervisor 304 might perform such additional operations as maintaining resources for workers to use (database connections, file handles, network connections, threads, etc.); load balancing among the workers (keep track of how many instances of a particular worker are running concurrently and route work among them, limit the number of concurrent workers based on system configuration, etc.); and monitoring job state changes to provide a common point of control for unexpected interruptions in the job flow. Moreover, the supervisor 304 may allow multiple workers to operate concurrently and share resources. Such workers would process different jobs in parallel. The supervisor 304 may manage the resource sharing among concurrently executing workers. The worker, in response to being invoked, queries the job status table 310 for the jobs having the input status of the invoked worker.

In response to being invoked, the invoked worker 312, 314, 318, 320, 322, 324, 326 or 328 would obtain a connection or handle to the database 252 from the supervisor 308. Alternatively, the worker may maintain its own connection to the database 252. Connections with the database 252 may utilize any database connection protocol known in the art, such as an as Open Database Connectivity (ODBC) to access the records in the database. The supervisor 304 maintains a constant open connection with the job status table 254 as the supervisor 304 is continuously polling the job status table for jobs to process. The worker 312, 314, 318, 320, 322, 324, 326 or 328 then performs its worker specific operations on the job. In processing the job, the worker may process the worker specific tables 258 which include configuration information for each worker depending on the attributes of a job. After completing the operations, the worker 312, 314, 318, 320, 322, 324, 326 or 328 sets the status for the job in the job status table 254 to one output status which will be used to cause the supervisor 304 to invoke the next worker in the workflow to access and process the job.

The job status table 304, supervisor 308 and workers 312, 314, 318, 320, 322, 324, 326 or 328 may be implemented on the same or separate machines. If the components are on separate machines or distributed among multiple server nodes, then the components would communicate over a network interconnecting the nodes.

When a worker is finished processing the job, then the supervisor 308, the worker or some other process would process the workflow transition table 256 to determine the appropriate output status to set for the job status. If the processing of the job failed, the worker may set the status to an error status to cause the supervisor 310 to invoke an error worker 380. Otherwise, the worker would set the job status to complete. In this way, the workflow path or order of job processing is defined by altering the current status field in the job status table to cause the supervisor 308 to change the current status and current worker to the next worker in the workflow based upon the workflow transition table 256.

Below are an example of the different workers that may be included in a production system.

The data conditioning worker 312 performs certain data cleaning and checking operations on the data in the customer record created at the input center 4. The data conditioning worker 312 may check each field in the customer record to determine if the entered data is valid, e.g., falls within a valid range. Alternatively, the data conditioning worker 312 could set the value in a field based on the value in another field. For instance, if the value in an age field is within one range, then the data conditioning worker 312 would set the set the status of the job to the input status of the page construction worker 314 to continue the job processing. Otherwise, if the value is within another range, then the data conditioning worker could set the status to "complete" to end the job. There may be a worker specific table 258 for the data conditioning worker that would indicate certain formatting to use for different fields in the customer record. In this way, the data conditioning worker 312 processes the customer data record to ensure that the data is valid and ready for the next operation.

Figure 5B:
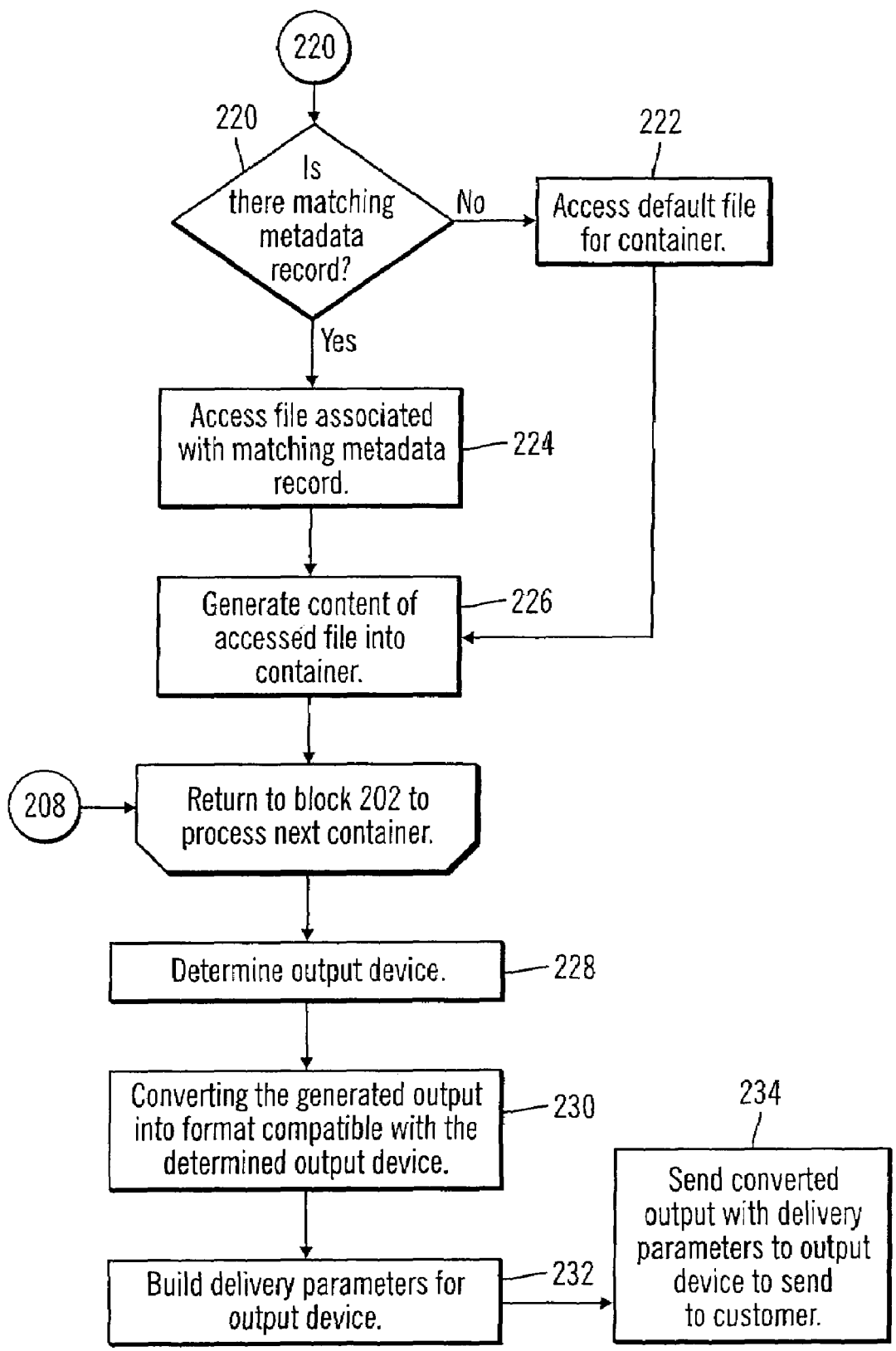

The page construction worker 314 performs the operations at blocks 200 to 208 in FIGS. 5a and 5b to fill in the template with data to generate a document in a page definition language such as PostScript.

After the document is generated, the imposition worker 318 may reformat how the document is specified to print given the page dimensions and dimensions of the paper on which the document will be printed. For instance, if the document pages are 8.5×11 inches and the printer paper is a roll of paper 18 inches wide, then the imposition worker 318 could reformat the Postscript file outputted from the page construction worker 314 to print two pages side-by-side. Further, if the document is specified to be printed as a pamphlet, then the imposition worker 318 may reset the formatting to print the first and last page, second and second to last page, etc., on the same page to form pamphlet pages.

To determine the settings to use, the imposition worker 318 may access a worker specific table 258 for the imposition worker that includes printing settings for different types of print jobs. For instance, there may be a record in the imposition worker specific table for pamphlet configuration parameters, a record for configuration settings for certain printers, etc. The imposition worker 318 may select a record in the worker specific table 258 based on field values in the customer record. In this way, the imposition worker 318 obtains parameters from the imposition worker specific table 258 to use to set print format values based on the value in certain fields of the customer record being processed.

The table of contents worker 320 generates a table of contents for the output document generated by the page construction worker 314 if the page construction worker 314 does not include the capability to generate the table of contents. In preferred embodiments, the table of contents may be predefined and maintained in a table of contents worker specific table 258. In such case, the table of contents worker 320 would determine the table of contents from the worker specific table 258 according to a value in the customer record indicating the document to produce. The table of contents specific table 258 would include records of table of contents to use for different documents. The table of contents worker 320 may scan the output document for certain section indicators and headers to determine the page numbers for the different sections listed in the table of contents. The table of contents worker 320 would insert the generated table of contents into the output document.

The graph worker 322 may generate graphs for the generated document if the page construction worker 314 does not include such a capability. The page construction worker 314 would then insert the generated graphs into the document being generated.

The output manager worker 324 would convert the generated output to a printer readable format, i.e., rasterize or transform the image into a bit map file. The output manager worker 324 would perform the steps at blocks 228–234 in FIG. 5b to rasterize the generated output file in a page description format such as PostScript and then convert to a format suitable for the output device 14, 16 or 18 specified in the customer record. The output manager worker 324 may access an output manager worker specific table 258 including delivery parameters to use depending on the selected delivery method. Thus, there would be a record in the output delivery worker specific table 258 for each type of delivery method including parameters to use when generating output for a particular output delivery method. The output manager worker 324 may comprise the InfoPrint Manager software for processing print files and routing to an output device.

The error worker 326 would process jobs having error status and perform error recovery operations. The error worker 327 may redrive a job by setting the output status to the input status of the first worker in the workflow or at any other worker in the workflow process.

The accounting worker 328 performs various accounting and billing operations after a print job is routed to the output device, i.e., has the delivered status. The accounting worker 328 could determine a cost for the print job based on the number of pages printed and the value of any items shipped with the printed output and then automatically generate an invoice to print and deliver to the customer via fax 16, e-mail 18, or postal mail.

A clean-up worker (not shown) may be used to delete jobs that have remained in the job status table 254 for a predetermined period of time or that have a completed status. This clean-up worker deletes all job-related files and information and the database records for the job.

Figure 9:
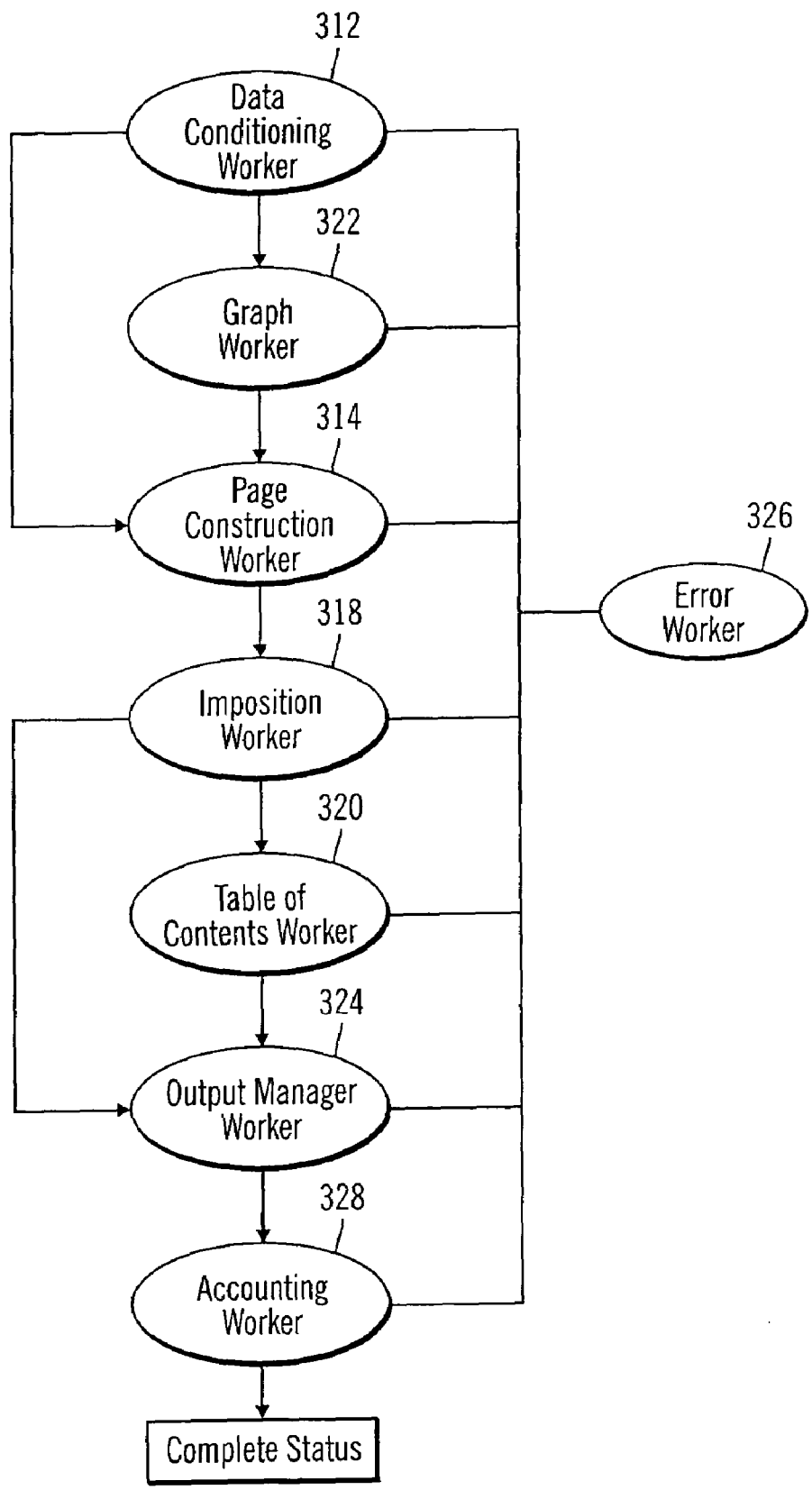
FIG. 9 is an example of the workflow in accordance with preferred embodiments of the present invention.

FIG. 6 further shows an example of possible input status values ready, build, impose, table of contents, graph, output, error, and delivered associated with the workers 312, 314, 318, 320, 324, 326, and 328 respectively. FIG. 9 illustrates outputs for the workers 312, 314, 318, 320, 324, 326, and 328. All workers have as a possible output the error worker 326, i.e., the error status, and likewise the error, worker 326 has as possible outputs every other worker. The arrows indicate possible output values for each worker, thereby providing a workflow. Workers 312 and 318 have more than one non-error output statuses. For instance the data conditioning worker 312, after successfully completing data conditioning operations, would set the status for the job to either graph or build. Thus, the data conditioning worker 312 would have to determine whether the job included graphs to build to determine the next possible status. Likewise, the imposition worker 318 would determine whether the job included a table of contents to determine whether to set the status to table contents or output. The accounting worker 328 has a non-error output status of completion to indicate the total completion of the job. The complete status is the input status to a clean worker which removes entries from the job status table 254 as discussed above.

In further embodiments, there may be multiple workers in the workflow process system for different classes of workers. An example of different classes of workers includes:
  data input worker class: reads data from customer sources by accessing customer data records entered at the data input computer 4, reading an input database, watching for files to arrive in a specific directory, and so on).
  data conditioning worker class: performs statistical characterization of data, removes records with spurious data, limits data to a valid range, manipulates existing data to produce new fields that workers might need, etc.
  formatting data worker class: generates text, image processing, generating graphs, charts and tables, etc.
  composing data worker class: lays out formatted objects on pages, generates tables of contents, indexes, flowing text, etc.
  processing composed pages worker class: imposes pages on sheets, encrypting the data stream, watermarks the data stream, sorts the data stream for efficient mailing, etc.
  output management worker class: sends processed pages to output devices and manages the print, fax, email, etc. procedure.
  post-processing management worker class: tracks and controls finishing equipment like folders, trimmers, drills, binders, as well as inserters and mailing procedures.
  follow up worker-class: handles notification of success or failure, handles errors for tracking and reporting
  accounting worker class: interfaces with foreign systems for accounting, billing, inventory control, etc.

Figure 10:
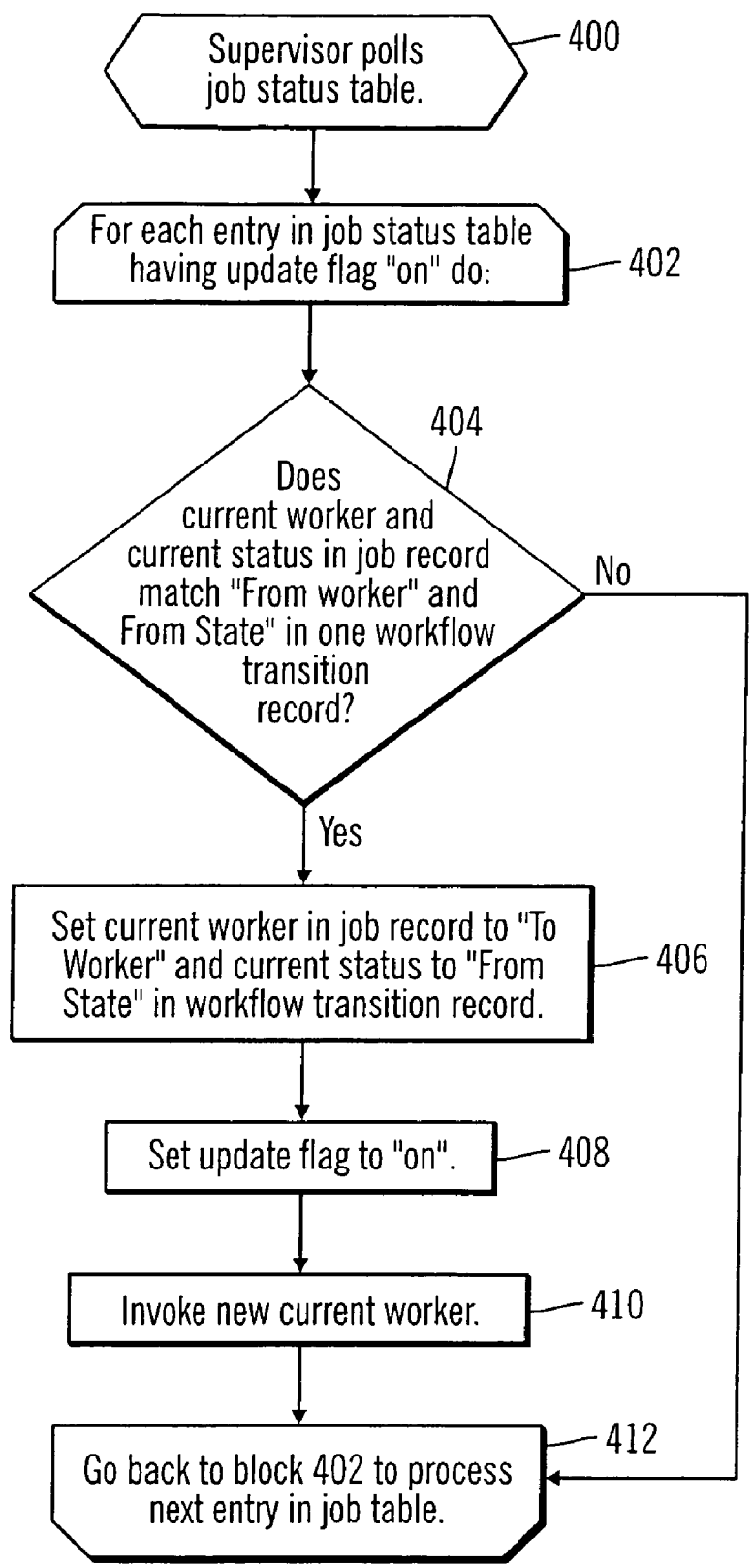
FIG. 10 illustrates logic to process a job status table to route a print job through the workflow system in accordance with preferred embodiments of the present invention.

The workflow management process is illustrated in FIGS. 9 and 10 and utilizing a job status table and workflow transition table as described with respect to FIGS. 7 and 8. Control begins at block 400 in FIG. 9 with the supervisor 304 polling the jobs status table 308 at predetermined intervals. The supervisor 304 begins a loop at block 402 and accesses each job record in the job entry table having the update flag on. For each job, the supervisor 304 determines (at block 404) whether the current worker and current status in the job record matches the "From Worker" and the "From State" in one record in the workflow transition table 256 for the workflow indicated in the workflow name field. If the supervisor 308 locates a matching record in the workflow transition table, then the supervisor 308 sets (at block 406) the current worker and current status in the job record being considered to the "From Worker" and "From State" in the located workflow transition record, and sets (at block 408) the update flag to "on". Setting the update flag "on" will trigger the worker to consider the record when querying the job status table 254. The supervisor 308 invokes (at block 410) the new current worker to process the job status table 254 and then proceeds (at block 412) to consider the next entry in the job status table having the update flag "on". In further embodiments, the supervisor 308 and worker may process records in the job status table 254 according to a priority ordering specified for each record in the job status table.

Figure 11:
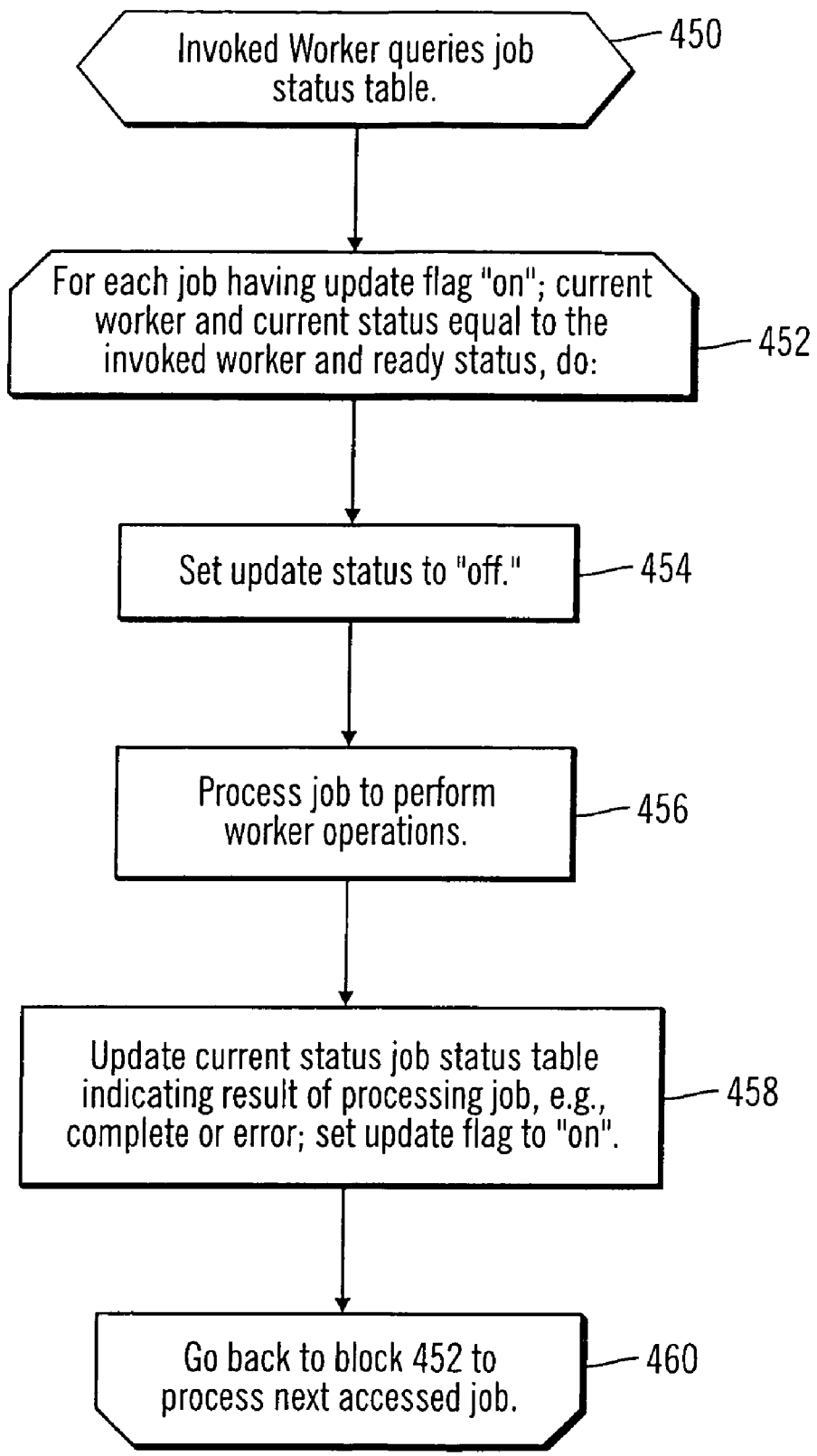
FIG. 11 illustrates worker logic to process a print job in accordance with preferred embodiments of the present invention.

FIG. 11 illustrates the steps performed by the workers 312–328 upon being invoked by the supervisor 304. If the worker being invoked is already processing the job status table 254, then the worker may ignore the invocation. At block 450, the invoked worker queries the job status table 254. The worker may query the job status table according to a priority ordering of the jobs in the job status table 254. The worker then begins a loop at block 452 to process each job having the update flag "on", and the current worker and current status equal to the invoked worker and ready status. The worker sets (at block 454) the update status to "off" for the record during the time the worker is processing the job. The worker performs (at block 454) the worker specific operations, e.g., data conditioning, generating a graph, constructing a page, imposition reformatting, generating a table of contents, generating and delivering output, accounting, etc. After completing job processing, the worker would then update (at block 458) the current state in the job record to the outcome of processing the job, e.g., complete or error and set the update flag to "on" to cause the supervisor 308 to consider the job record. Alternatively, the worker may send a message to the supervisor 304 indicating the outcome of the job processing, e.g., success, error, etc. The worker would proceed (at block 460) back to block 452 to consider more jobs having the worker status in the job status table 254.

In this way, the job status table 254 and workflow transition table 256 are used to provide a database driven workflow management system to produce output, such as printed or otherwise distributed customer materials.

In preferred embodiments, the database 252 includes the job status history table 262 that has a field for the job id, the status, and a time stamp when the status was set. Every time the supervisor 304 updates the status for the job, the supervisor 304 would also add the new status to the job status history table 262. This history table 262 may be used for tracking purposes to allow a tracking program to determine where a job has been and its current position in the workflow process.

The preferred workflow management embodiment provides a method, system, and program to automatically route a job through the workflow system in an order defined by input and output status settings for the workers. In this way, a print job is automatically routed through the system by a series of worker processes without the need for human intervention, except when manual operations must be performed, e.g., inserting documents into an envelop, cutting, etc. Even when manual operations are involved, the automated workers may monitor the status of manual operations.

When the workflow is implemented in a distributed computing environment, then the job status table could contain information on the job utilized by the workflow threads to identify the location of the job in the workflow environment.

CONCLUSION/ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a network system. However, in alternative embodiments, the software and system may be implemented in a single stand alone printer, including the functions performed by the data input computer and printer manager, database program, an e-mail and fax connection, and an attached printer. This would allow a smaller business to utilize the preferred embodiments to design and execute a direct mail campaign to distribute marketing materials. Alternatively, certain of the functions shown as distributed in FIG. 1 may be combined in any manner into one or more systems. For instance, a single computer may include the functions of the output constructor 10 and data input computer 4.

Preferred embodiments described the job status table, workflow transition table, customer information, metadata describing the files, and other tables as implemented as database records in a database table. However, any of the information described as being implemented as a database table may be implemented in any format for maintaining object information, including spreadsheet, non-database table, etc. Thus, as used herein, the terms database record, database table, metadata, and database refer to any data structure known in the art for maintaining information on data objects, such as relational databases, non-relational databases, spreadsheets, ASCII text files, etc.

In further embodiments, there may be numerous data input computers 4 where many operators gather customer information to continually update the customer records in the customer database.

Preferred embodiments were described with respect to corporate users of printer products. However, in further embodiments the customer may comprise individuals as well as businesses. Moreover, the product information represented in the customer records may be for any possible product. In this way, preferred embodiments may be used to target a direct mail or e-mail campaign to numerous individuals. Thus, the term "customer" as used herein refers to any intended recipient of output generated in accordance with preferred embodiments.

Preferred embodiments were described with respect to generating marketing materials. However, in further embodiments, the system of the preferred embodiments may be used to generate material for distribution for non-commercial purpose. For instance, a non-profit organization or election campaign could utilize information to generate materials to distribute to individuals to develop interest in their cause. Alternatively, a corporation or any other person, could use the preferred embodiments to deliver tailored information to a group of people, such as employees, friends, etc.

Preferred embodiments were described with respect to invoking workers. The step of invoking a worker may comprise invoking a worker subroutine or sending a message to an active worker.

Preferred embodiments provided and example of workers used to create and deliver marketing materials. In alternative embodiments, functions described with respect to one worker may be divided into multiple different workers. Further, additional workers may be added to perform further document processing operations. For instance, workers may be used to monitor any pre or post processing equipment involving machine or human controlled processing, such as inserting, trimming, unwinding or any other finishing operation.

Preferred embodiments were described with respect to specific information types in the customer records describing customer preferences with respect to a printing system. However, in further embodiments when different products or customers are involved, the customer record may include any number of fields describing any type of customer preference, desire, goal, current products that are used, etc., that could be helpful in creating and selecting content to include in customized marketing materials.

In summary, preferred embodiments disclose a workflow management system for creating and delivering output material. A customer record is generated to include fields specifying at least one product, customer preferences, and a selected output method to deliver generated output material on the product specified in the customer record. A job record including a status field is added to a job status table for the customer record. The added job record status is set to a first status. A selected job is processed in the job status table. A first worker is invoked if the selected job has the first status. The first worker generates output material from processing the product and customer preference fields in the customer record for the selected job. The status for the selected job in the job status table is set to a second status after generating the output material. A second worker is invoked if the selected job has the second status. The second worker determines a selected one of a plurality of delivery options from the customer record for the selected job and transmits the output material via the determined delivery option to the customer specified in the customer record.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A workflow management system for creating and delivering output material, comprising:

computational resources;

at least one system computer readable medium including a job status table, a database table, and content files; and code executed by the computational resources and implementing a first and second workers, wherein the code is executed to perform operations, the operations comprising:

generating a customer record to include fields specifying at least one product, customer preferences, and a selected delivery option indicating a method to deliver generated output material on the product specified in the customer record;

adding a job record including a status field to the job status table for the customer record;

setting the added job record status to a first status;

processing a selected job in the job status table;

invoking the first worker if the selected job has the first status;

generating, with the first worker, output material from processing the product and customer preference fields in the customer record for the selected job by (i) processing a template including queries of records in the database table;

(ii) accessing at least one value in a field in one customer record to include in one query from the template against the database table;

(iii) applying the query against the database table to determine a record associated with one content file and including fields matching the query;

(iv) accessing the content file associated with the determined record; and (v) generating the content from the at least one accessed content file into the template, which forms the output material;

setting the status for the selected job in the job status table to a second status after generating the output material with the first worker;

invoking the second worker if the selected job has the second status;

determining, with the second worker, a selected one of a plurality of delivery options from the customer record for the selected job; and transmitting, with the second worker, the output material via the determined delivery option to the customer specified in the customer record.

2. The system of claim 1, wherein the first status is associated with the first worker and the second status is associated with the second worker, wherein the first and second workers further comprise means for querying the job status table to access all jobs having the status associated with the worker.

3. The system of claim 1, wherein the operations performed by the executed code further comprise:

determining, with the first and second workers, whether an error occurred while processing the selected job;

setting, with the first and second workers, the status in the job status table for the selected job to an error status;

invoking an error worker if the selected job has the error status;

performing, with the error worker, error recovery operations for the selected job; and setting, with the error worker, the status of the selected job to one of the first and second statuses after the error recovery operation.

4. The system of claim 1, wherein the code includes a supervisor program that processes the job status table and polls the job status table at predetermined intervals, wherein the supervisor program performs the operations of invoking the first and second workers, and wherein the supervisor program further processes every record in the job status table when performing the polling operation.

5. The system of claim 4, wherein the code further includes an imposition worker and table of contents worker, wherein the supervisor program further performs operations comprising:

setting the job status to an imposition status and table of content status; and invoking the imposition and table of content workers.

6. The system of claim 1, wherein the at least one system computer readable medium comprises storage devices distributed in a network and wherein the code is implemented in a database workflow engine coupled to the network and capable of communicating with the storage devices over the network.

7. A workilow management system for creating and delivering output material, comprising:

computational resources;

at least one system computer readable medium including:

a job status table;

a worker transition table including a plurality of records, each indicating an input worker, a completion state, an output worker, and an output state, wherein the input worker indicates the worker assigned to process the job, the completion state is a status indicated for the job after the input worker processes the job, the output worker is the worker that processes the job after having been processed by the input worker and resulting in the completion state, and the output state is the state to which the job status in the job status table is set, and wherein the job status table further indicates a current worker assigned to process the job;

code executed by the computational resources and implementing a first and second workers, wherein the code is executed to perform operations, the operations comprising:

generating a customer record to include fields specifying at least one product, customer preferences, and a selected delivery option indicating a method to deliver generated output material on the product specified in the customer record;

adding a job record including a status field to the job status table for the customer record;

setting the added job record status to a first status;

processing a selected job in the job status table;

invoking a first worker if the selected job has the first status;

generating, with the first worker, output material from processing the product and customer preference fields in the customer record for the selected job;

setting the status for the selected job in the job status table to a second status after generating the output material with the first worker by determining from the worker transition table one record having an input worker and completion state matching the current worker and the job status, respectively, and setting the status for the selected job to the output state and the current worker to the output worker;

invoking the second worker if the selected job has the second status;

determining, with the second worker, a selected one of a plurality of delivery options from the customer record for the selected job; and transmitting, with the second worker, the output material via the determined delivery option to the customer specified in the customer record.

8. The system of claim 7, wherein the code further causes operations comprising invoking the output worker after setting the job status to the output status.

9. The system of claim 7, wherein setting the status for the selected job after processing the job with one worker is performed by the worker that completed processing the job setting the completion status to a state indicating an outcome of processing the job.

10. A workflow management system for creating and delivering output material, comprising:
  computational resources;
  a system computer readable medium including a job status table; and
  code executed by the computational resources and implementing a first worker, a second worker, and a data conditioning worker, wherein the code is executed to perform operations, the operations comprising:
    generating a customer record to include fields specifying at least one product, customer preferences, and a selected delivery option indicating a method to deliver generated output material on the product specified in the customer record;
    adding a job record including a status field to the job status table for the customer record;
    setting the added job record status to a first status;
    processing a selected job in the job status table;
    invoking the first worker if the selected job has the first status;
    generating, with the first worker, output material from processing the product and customer preference fields in the customer record for the selected job;
    setting the status for the selected job in the job status table to a second status after generating the output material with the first worker;
    invoking the second worker if the selected job has the second status;
    determining, with the second worker, a selected one of a plurality of delivery options from the customer record for the selected job;
    transmitting, with the second worker, the output material via the determined delivery option to the customer specified in the customer record;
    setting the status to a third status after adding the job in the job status table;
    invoking the data conditioning worker if the job status for the selected job is the third status;
    processing, with the data conditioning worker, the customer record to determine whether at least one value satisfies at least one condition;
    taking corrective actions, with the data conditioning worker, if the data in the customer record does not satisfy each condition; and
    setting the status of the selected job to the first status if the data in the customer record satisfies each condition.

11. A workflow management system for creating and delivering output material, comprising:
  computational resources;
  a system computer readable medium including a job status table; and
  code executed by the computational resources and implementing a first worker, a second worker, and an accounting worker, wherein the code is executed to perform operations, the operations comprising:
    generating a customer record to include fields specifying at least one product, customer preferences, and a selected delivery option indicating a method to deliver generated output material on the product specified in the customer record;
    adding a job record including a status field to the job status table for the customer record;
    setting the added job record status to a first status;
    processing a selected job in the job status table;
    invoking the first worker if the selected job has the first status;
    generating, with the first worker, output material from processing the product and customer preference fields in the customer record for the selected job;
    setting the status for the selected job in the job status table to a second status after generating the output material with the first worker;
    invoking the second worker if the selected job has the second status;
    determining, with the second worker, a selected one of a plurality of delivery options from the customer record for the selected job;
    transmitting, with the second worker, the output material via the determined delivery option to the customer specified in the customer record;
    generating information on the output material;
    setting the status for the selected job in the job status table to a third status;
    invoking an accounting worker if the job has the third status;
    processing, with the accounting worker, the generated information on the output material to determine costs of generating the output material; and
    generating, with the accounting worker, an invoice including the determined costs of the output material.

12. An article of manufacture for use in a workflow management system for creating and delivering output material, the article of manufacture including code implemented in a computer readable medium, wherein the code implements a first worker and second worker, wherein the code is enabled to access a job status table, a database table, and content files, and wherein the code is executed to perform operations comprising:
  generating a customer record to include fields specifying at least one product, customer preferences, and a selected delivery option indicating a method to deliver generated output material on the product specified in the customer record;
  adding a job record including a status field to the customer record;
  setting the added job record status to a first status;
  processing a selected job in the job status table;
  invoking the first worker if the selected job has the first status;
  generating, with the first worker, output material from processing the product and customer preference fields in the customer record for the selected job by:
    (i) processing a template including queries of records in the database table;
    (ii) accessing at least one value in a field in one customer record to include in one query from the template against the database table;
    (iii) applying the query against the database table to determine a record associated with a file including fields matching the query;

(iv) accessing the one content file associated with the determined record; and (v) generating the content from the at least one accessed content file into the template, which forms the output material;

setting the status for the selected job in the job status table to a second status after generating the output material with the first worker;

invoking the second worker if the selected job has the second status;

determining, with the second worker, a selected one of a plurality of delivery options from the customer record for the selected job; and transmitting, with the second worker, the output material via the determined delivery option to the customer specified in the customer record.

13. The article of manufacture of claim 12, wherein the first status is associated with the first worker and the second status is associated with the second worker, wherein the first and second workers farther cause querying the job status table to access all jobs having the status associated with the worker.

14. The article of manufacture of claim 12, wherein the code further implements an error worker, and wherein the operations farther comprise:

determining, with the first and second workers, whether an error occurred while processing the selected job;

setting, with the first and second workers, the status in the job status table for the selected job to an error status;

invoking the error worker if the selected job has the error status;

performing, with the error worker, error recovery operations for the selected job; and setting, with the error worker, the status of the selected job to one of the first and second statuses after the error recovery operation.

15. The article of manufacture of claim 12, wherein the code further implements a supervisor program, wherein the job status table is processed by the supervisor program that polls the job status table at predetermined intervals, wherein the supervisor program invokes the first and second workers, and wherein the supervisor program processes every record in the job status table when performing the polling operation.

16. The article of manufacture of claim 15, wherein the code further implements an imposition worker and table of contents worker, wherein the supervisor program sets the job status to an imposition status and table of content status, and wherein the supervisor program invokes the imposition and table of content workers.

17. An article of manufacture for use in a workflow management system for creating and delivering output material, the article of manufacture including code implemented in a computer readable medium, wherein the code implements a first worker and second worker, wherein the code is enabled to access a job status table, and wherein the code is executed to perform operations comprising:

generating a customer record to include fields specifying at least one product, customer preferences, and a selected delivery option indicating a method to deliver generated output material on the product specified in the customer record;

adding a job record including a status field to the job status table for the customer record;

providing a worker transition table includes a plurality of records, each indicating an input worker, a completion state, an output worker, and an output state, wherein the input worker indicates the worker assigned to process the job, the completion state is a status indicated for the job after the input worker processes the job, the output worker is the worker that processes the job after having been processed by the input worker and resulting in the completion state, and the output state is the state to which the job status in the job status table is set, and wherein the job status table further indicates a current worker assigned to process the job;

setting the added job record status to a first status;

processing a selected job in the job status table;

invoking the first worker if the selected job has the first status;

generating, with the first worker, output material from processing the product and customer preference fields in the customer record for the selected job;

setting the status for the selected job in the job status table to a second status after generating the output material with the first worker, wherein setting the status for the selected job in the job status table comprises determining from the worker transition table one record having an input worker and completion state matching the current worker and the job status, respectively, and setting the status for the selected job to the output state and the current worker to the output worker;

invoking the second worker if the selected job has the second status;

determining, with the second worker, a selected one of a plurality of delivery options from the customer record for the selected job; and transmitting, with the second worker, the output material via the determined delivery option to the customer specified in the customer record.

18. The article of manufacture of claim 17, wherein the operations further comprise invoking the output worker after setting the job status to the output status.

19. The article of manufacture of claim 17, wherein setting the status for the selected job after processing the job with one worker comprises the worker that completed processing the job setting the completion status to a state indicating an outcome of processing the job.

20. An article of manufacture for use in a workflow management system for creating and delivering output material, the article of manufacture including code implemented in a computer readable medium, wherein the code implements a first worker, a second worker, and a data conditioning worker, wherein the code is enabled to access a job status table, and wherein the code is executed to perform operations comprising:

generating a customer record to include fields specifying at least one product, customer preferences, and a selected delivery option indicating a method to deliver generated output material on the product specified in the customer record;

adding a job record including a status field to the job status table for the customer record;

setting the added job record status to a first status;

processing a selected job in the job status table;

invoking the first worker if the selected job has the first status;

generating, with the first worker, output material from processing the product and customer preference fields in the customer record for the selected job;

setting the status for the selected job in the job status table to a second status after generating the output material with the first worker;

invoking the second worker if the selected job has the second status;

determining, with the second worker, a selected one of a plurality of delivery options from the customer record for the selected job;

transmitting, with the second worker, the output material via the determined delivery option to the customer specified in the customer record;

setting the status to a third status after adding the job in the job status table;

invoking the data conditioning worker if the job status for the selected job is the third status;

processing, with the data conditioning worker, the customer record to determine whether at least one value satisfies at least one condition;

taking corrective actions, with the data conditioning worker, if the data in the customer record does not satisfy each condition; and setting the status of the selected job to the first status if the data in the customer record satisfies each condition.

21. An article of manufacture for use in a workflow management system for creating and delivering output material, the article of manufacture including code implemented in a computer readable medium, wherein the code implements a first worker, a second worker, and an accounting worker, wherein the code is enabled to access a job status table, a database table, and content files, and wherein the code is executed to perform operations comprising:

generating a customer record to include fields specifying at least one product, customer preferences, and a selected delivery option indicating a method to deliver generated output material on the product specified in the customer record;

adding a job record including a status field to a job status table for the customer record;

setting the added job record status to a first status;

processing a selected job in the job status table;

invoking the first worker if the selected job has the first status;

generating, with the first worker, output material from processing the product and customer preference fields in the customer record for the selected job;

setting the status for the selected job in the job status table to a second status after generating the output material with the first worker;

invoking the second worker if the selected job has the second status;

determining, with the second worker, a selected one of a plurality of delivery options from the customer record for the selected job;

transmitting, with the second worker, the output material via the determined delivery option to the customer specified in the customer record;

generating information on the output material;

setting the status for the selected job in the job status table to a third status;

invoking the accounting worker if the job has the third status;

processing, with the accounting worker, the generated information on the output material to determine costs of generating the output material; and generating, with the accounting worker, an invoice including the determined costs of the output material.

* * * * *